US009552600B1

(12) United States Patent
Goldberg et al.

(10) Patent No.: US 9,552,600 B1
(45) Date of Patent: *Jan. 24, 2017

(54) GENERATING AND UPDATING RECOMMENDATIONS FOR MERCHANTS

(71) Applicant: Amazon Technologies, Inc., Reno, NV (US)

(72) Inventors: Anton V. Goldberg, Bellevue, WA (US); Trevor Alexander Popiel, Lynnwood, WA (US); Robert H. Mahfoud, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 490 days.

This patent is subject to a terminal disclaimer.

(21) Appl. No.: 13/739,427

(22) Filed: Jan. 11, 2013

Related U.S. Application Data

(63) Continuation of application No. 12/822,566, filed on Jun. 24, 2010, now Pat. No. 8,355,954.

(51) Int. Cl.
| G06Q 30/00 | (2012.01) |
| G06Q 30/06 | (2012.01) |
| G06Q 10/06 | (2012.01) |

(52) U.S. Cl.
CPC ... *G06Q 30/0601* (2013.01); *G06Q 10/063114* (2013.01); *G06Q 30/0631* (2013.01)

(58) Field of Classification Search
CPC .................................. G06Q 30/0601–30/0645

USPC ............................................... 705/26.1–27.2
See application file for complete search history.

(56) References Cited

U.S. PATENT DOCUMENTS

| 7,877,686 | B2 * | 1/2011 | Abbott et al. ............... 715/712 |
| 2003/0154442 | A1 * | 8/2003 | Papierniak ................. 715/501.1 |
| 2006/0253345 | A1 * | 11/2006 | Heber ............................. 705/27 |
| 2008/0133500 | A1 * | 6/2008 | Edwards et al. .................. 707/5 |
| 2009/0234665 | A1 | 9/2009 | Conkel | |

OTHER PUBLICATIONS

Frook, J. E. (2000). Cisco gets back to basics with e-commerce checklist. Advertising Age's Business Marketing, 85(1), 2-2,36. Retrieved from http://search.proquest.com/docview/209437395?accountid=14753.*
McGaughey, R. E., & Mason, K. H. (1998). The Internet as a marketing tool. Journal of Marketing Theory and Practice, 6(3), 1-11.

* cited by examiner

*Primary Examiner* — Resha Desai
(74) *Attorney, Agent, or Firm* — Thomas | Horstemeyer, LLP

(57) ABSTRACT

Disclosed are various embodiments for generating and updating recommendations for merchants. A recommendation for a merchant in an electronic marketplace is evaluated to determine whether a corresponding action for the recommendation has been completed in response to a recommendation query for the merchant. A list of recommendations that correspond to actions that have not yet been completed for the merchant is generated.

20 Claims, 5 Drawing Sheets

GENERATING AND UPDATING RECOMMENDATIONS FOR MERCHANTS

CROSS REFERENCE TO RELATED APPLICATIONS

This application is a continuation of, and claims priority to, co-pending U.S. Patent Application entitled "GENERATING AND UPDATING RECOMMENDATIONS FOR MERCHANTS," filed on Jun. 24, 2010, and assigned application Ser. No. 12/822,566, which is incorporated herein by reference in its entirety.

BACKGROUND

Various online entities such as Google® or Yahoo® facilitate electronic marketplaces in which multiple sellers may offer products to consumers. Many of the sellers that list products may operate their enterprises in a manner that ultimately reduces their profitability due to a lack of knowledge and experience as to how to run an online enterprise.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to generating and updating recommendations to merchants in an electronic marketplace. The recommendations may relate to specific advice for a merchant to perform one or more actions to improve an online presence of the merchant in the electronic marketplace. When a merchant performs or completes an action, the recommendation becomes invalid. However, in various embodiments, due to system performance requirements, it may be infeasible to determine which recommendations are invalid synchronously when a list of recommendations is requested. In various embodiments, certain recommendations may be evaluated for validity in advance and then selectively reevaluated for validity in response to merchant-driven events. In the following discussion, a general description of the system and its components is provided, followed by a discussion of the operation of the same.

Figure 1:
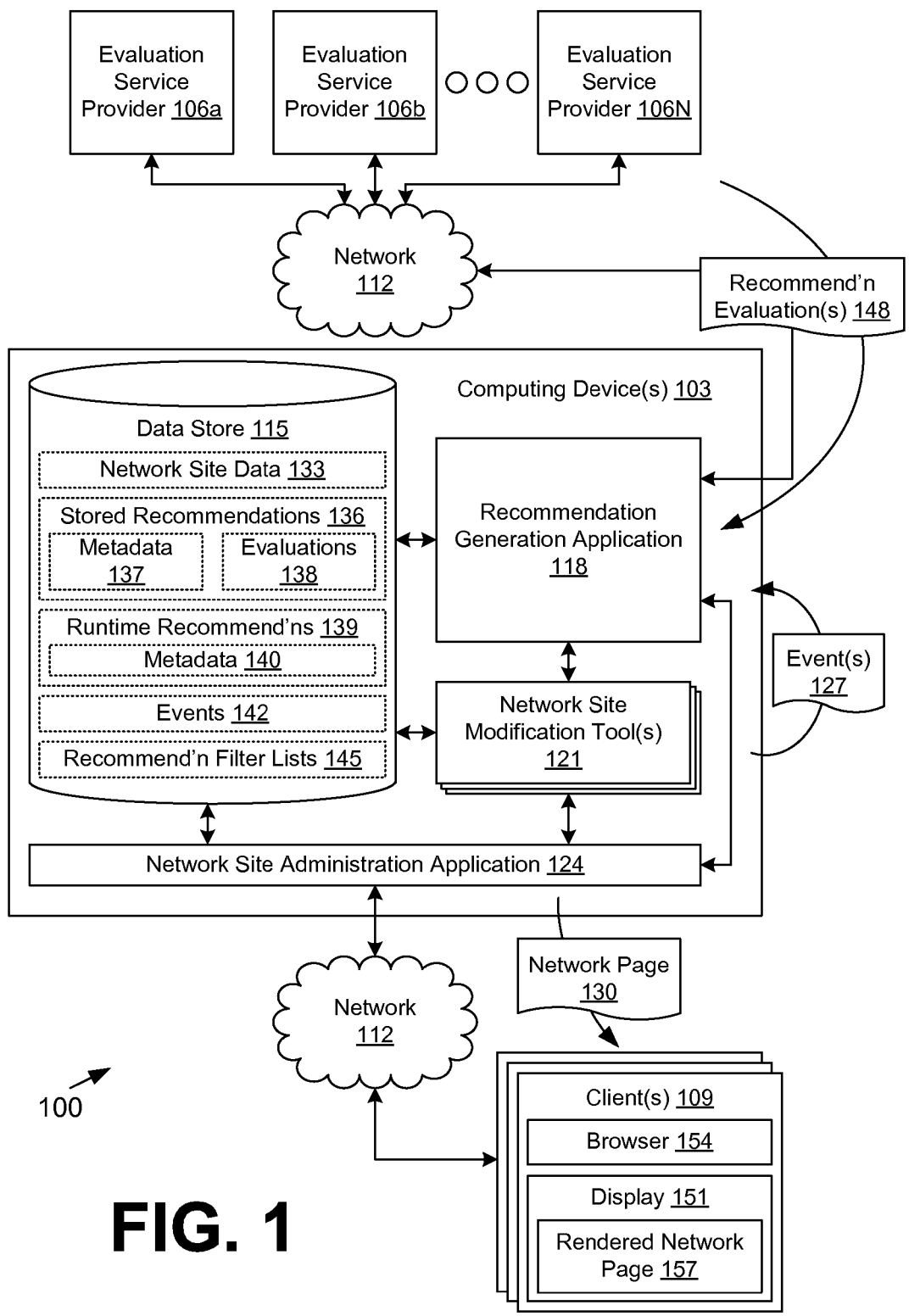
FIG. 1 is a drawing of a networked environment according to various embodiments of the present disclosure.

With reference to FIG. 1, shown is a networked environment 100 according to various embodiments. The networked environment 100 includes one or more computing devices 103, a plurality of evaluation service providers 106, and one or more clients 109 in data communication by way of a network 112. The network 112 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks, computer banks, or other arrangements. For example, a plurality of computing devices 103 together may comprise, for example, a cloud computing resource, a grid computing resource, and/or any other distributed computing arrangement. Such computing devices 103 may be located in a single installation or may be dispersed among many different geographical locations. In one embodiment, the computing device 103 represents a virtualized computer system executing on one or more physical computing systems. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 115 that is accessible to the computing device 103. The data store 115 may be representative of a plurality of data stores as can be appreciated. The data stored in the data store 115, for example, is associated with the operation of the various applications and/or functional entities described below.

The components executed on the computing device 103, for example, include a recommendation generation application 118, one or more network site modification tools 121, a network site administration application 124, and other applications, services, processes, systems, engines, or functionality not discussed in detail herein. The recommendation generation application 118 is executed to generate a list of recommendations for a merchant in an electronic marketplace to take specific actions to improve the online presence of the merchant in the electronic marketplace.

The network site modification tools 121 are executed by the merchant to manipulate various aspects of the online presence of the merchant in the electronic marketplace. As non-limiting examples, respective network site modification tools 121 may enable a merchant to configure acceptable payment methods, edit an online catalog of items, establish return policies, establish shipping policies, and any other actions associated with an online presence of the merchant. When a merchant begins a network site modification session, leaves the network site modification session, or performs some other action with a network site modification tool 121, the network site modification tool 121 may be configured to submit one or more events 127 to the recommendation generation application 118. In one embodiment, the network site modification tools 121 are executed on different ones of the computing devices 103.

The network site administration application 124 is executed to provide a gateway to access the network site modification tools 121 and other information regarding the online presence and network site of the merchant. To this end, the network site administration application 124 may be configured to generate one or more network pages 130 including a list of recommendations for the merchant generated by the recommendation generation application 118, links to the network site modification tools 121, and/or other information. The network pages 130 may comprise, for example, web pages and/or any other type of network content that may be served up by the network site administration application 124.

In various embodiments, the network site administration application 124 may include a network page server to serve data such as the network pages 130 to clients 109 over a protocol such as hypertext transfer protocol (HTTP), simple object access protocol (SOAP), and/or other protocols. Such a network page server may comprise a commercially available network page server such as, for example, Apache® HTTP Server, Microsoft® Internet Information Services (IIS), and/or other network page servers.

The data stored in the data store 115 includes, for example, network site data 133, stored recommendations 136 including metadata 137 and evaluations 138, runtime recommendations 139 including metadata 140, events 142, recommendation filter lists 145, and potentially other data. The network site data 133 includes data relating to network sites of merchants in an electronic marketplace. Such network site data 133 may include configuration settings, hypertext markup language (HTML) data, extensible markup language (XML) data, style sheets, Java Script code, images, audio, video, animations, product catalog data, order data, customer data, and/or any other data relating to a network site of a merchant.

The stored recommendations 136 include recommendations for merchants that have been previously evaluated for validity. To this end, the stored recommendations 136 include metadata 137 regarding the recommendation and how it may be evaluated and results of evaluations 138 that have been stored. In one embodiment, such stored recommendations 136 may be evaluated for all merchants in the electronic marketplace as part of a batch process that is executed by the recommendation generation application 118 at a predetermined interval. In one embodiment, some or all of the stored recommendations 136 may use a relatively long time period for evaluation. The runtime recommendations 139, by contrast, are recommendations that are evaluated for validity at runtime for a merchant when a list of recommendations is generated for a merchant by the recommendation generation application 118. Each runtime recommendation 139 may include metadata 140 regarding the recommendation and how it may be evaluated. In one embodiment, some or all of the runtime recommendations 139 may use a relatively short time period for evaluation.

The events 142 may correspond to events 127 that have been stored in the data store 115 by the recommendation generation application 118 or some other application. The events 142 may indicate that a merchant has commenced a network site modification session using a network site modification tool, has ended or abandoned the network site modification session, has performed or completed one or more actions corresponding to recommendations, and any other merchant-driven events.

The recommendation filter lists 145 may indicate one or more recommendations that are invalid generally or for particular merchants. For example, a merchant may not wish to perform a certain action associated with a recommendation. In such a case, the merchant may be able to indicate to the network site administration application 124 or another application that the recommendation is undesired or invalid. Such an indication may be stored as a recommendation filter list 145 corresponding to the merchant. Thus, the recommendation generation application 118 may be configured to filter a list of recommendations based in part on a recommendation filter list 145.

Each of the evaluation service providers 106a . . . 106N may comprise, for example, a server computer or any other system providing computing capability. Alternatively, a plurality of computing systems may be employed that are arranged, for example, in one or more server banks, computer banks, or other arrangements. For example, an evaluation service provider 106 may comprise, for example, a cloud computing resource, a grid computing resource, and/or any other distributed computing arrangement. Such devices may be located in a single installation or may be dispersed among many different geographical locations. In one embodiment, an evaluation service provider 106 corresponds to a virtualized computer system executing on one or more physical computing systems. In one embodiment, multiple evaluation service providers 106 may correspond to a single computing system. In one embodiment, an evaluation service provider 106 may be a system executing on the computing device 103.

A respective evaluation service provider 106 is queried by the recommendation generation application 118 to evaluate a recommendation. More specifically, an evaluation service provider 106 determines whether one or more actions associated with a recommendation has been completed or performed. As a non-limiting example, where a recommendation is for a merchant to add a returns policy, an evaluation service provider 106 may be configured to analyze the network site data 133 to determine whether a returns policy exists. Consequently, the evaluation service provider 106 may generate a recommendation evaluation 148 that is returned to the recommendation generation application 118. The recommendation evaluation 148 may indicate, for example, that the action has not been performed and the corresponding recommendation is valid, or that the action has been performed and the corresponding recommendation is invalid. Depending on the evaluation task(s), various evaluation service providers 106 may use different amounts of time to process a recommendation and to return a recommendation evaluation 148.

The client 109 is representative of a plurality of client devices that may be coupled to the network 112. The client 109 may comprise, for example, a processor-based system such as a computer system. Such a computer system may be embodied in the form of a desktop computer, a laptop computer, a personal digital assistant, a cellular telephone, set-top box, music players, web pads, tablet computer systems, or other devices with like capability. The client 109 may include a display 151. The display 151 may comprise, for example, one or more devices such as cathode ray tubes (CRTs), liquid crystal display (LCD) screens, gas plasma-based flat panel displays, LCD projectors, or other types of display devices, etc.

The client 109 may be configured to execute various applications such as a browser 154 and/or other applications. The browser 154 may be executed in a client 109, for example, to access and render network pages 130, such as web pages or other network content served up by the computing device 103 and/or other servers. A rendered network page 157 may be displayed on the display 151. The client 109 may be configured to execute applications beyond browser 154 such as, for example, email applications, instant message applications, and/or other applications.

Next, a general description of the operation of the various components of the networked environment 100 is provided. To begin, the recommendation generation application 118 processes the stored recommendations 136 for some or all of the merchants in the electronic marketplace. The stored recommendations 136 may be evaluated for each of the merchants by querying the appropriate evaluation service provider(s) 106. Corresponding recommendation evaluations 148 are returned to the recommendation generation application 118, which then stores in the data store 115 indication(s) of whether the action(s) associated with the recommendation have been completed or performed. A timestamp may be associated with the indication(s) to show when the recommendation was determined to be valid or invalid. As used herein, the term "timestamp" may refer either to a physical timestamp that corresponds to an actual time or to a logical timestamp that corresponds to a point in a sequence but does not necessarily correspond to an actual time.

The stored recommendations 136 may be processed and evaluated, for example, at a predetermined interval as part of a batch process. As a specific non-limiting example, the stored recommendations 136 may be processed and evaluated daily in the early morning hours when a computing system load is relatively lower. The selection of recommendations for inclusion in the stored recommendations 136 may be based, for example, on whether the time to process and evaluate the recommendation would unduly delay the generation of a list of recommendations for a merchant. It may be a design goal in some embodiments for the list of recommendations to be generated as quickly as possible, for example, so as not to introduce unacceptable latency in the generation of a network page 130.

A merchant user at a client 109 may log into the network site administration application 124 and begin administering the network site of the merchant in the electronic marketplace. The merchant user may access one or more of the network site modification tools 121. When the merchant user accesses a network site modification tool 121, a network site modification session may be commenced. Such a session may be used to maintain state in the network site modification tool 121 across succeeding accesses of network pages 130 by the client 109.

When a session is commenced, the network site modification tool 121 may generate and send one or more events 127 to the recommendation generation application 118 informing the recommendation generation application 118 that the merchant user may be in the process of performing or completing one or more actions that may be associated with one or more recommendations. In other words, the corresponding recommendations that were previously valid may potentially be invalidated at a later time. Alternatively, recommendations that were previously valid may potentially become invalid in some embodiments.

As a non-limiting example, where a recommendation is for a merchant to add a banner image to the online presence of the merchant, a network site modification tool 121 that comprises a heading layout editor may be configured to send an event 127 to the recommendation generation application 118 regarding a potential addition of a banner image. Assuming that the addition of a banner image corresponds to a stored recommendation 136, the recommendation generation application 118 may store the event 127 in events 142 and/or indicate that the corresponding stored recommendation 136 be reevaluated when necessary. Each event 127 may be associated with a timestamp, for example, in order to verify the sequencing of the receipt of the event 127 and the evaluation of a stored recommendation 136.

In one embodiment, when a merchant user performs an action using the network site modification tool 121 that would invalidate or nullify a recommendation, the network site modification tool 121 may be configured to send another type of event 127 to the recommendation generation application 118. The recommendation generation application 118 may then store the event 127 in events 142 and may indicate that any corresponding stored recommendation 136 or runtime recommendation 139 is invalid and will not need to be evaluated. To this end, the corresponding recommendation may be added to the recommendation filter list 145 for the merchant.

In one embodiment, when a merchant user abandons or explicitly exits a network site modification session without having completed or performed the action associated with a recommendation, the network site modification tool 121 may be configured to send another type of event 127 to the recommendation generation application 118 indicating that the session has ended. In this case, the recommendation generation application 118 may know that the stored recommendation 136 is still valid. The events 142 and/or the stored recommendations 136 may be updated to indicate that the network site modification session did not invalidate the corresponding recommendations.

In some embodiments, the events 127 may identify the originating network site modification tool 121 in place of the specific action that may be performed or recommendation that may be invalidated (or validated). In such embodiments, the recommendation generation application 118 may have knowledge of which actions/recommendations are associated with specific network site modification tools 121.

The recommendation generation application 118 may receive a recommendation query for a merchant. A recommendation query prompts the recommendation generation application 118 to generate a list of currently valid recommendations for a merchant. Such a recommendation query may, for example, be sent synchronously to the recommendation generation application 118 following a request by a client 109 for a network page 130 that includes the current recommendations. As a non-limiting example, a merchant user may request a network page 130 containing a "seller dashboard" of recommended actions to improve the network site of the merchant.

In another embodiment, a recommendation query may be generated automatically by the network site administration application 124 for delivery of the list of recommendations in an email message, text message, telephone call, or other medium of delivery. Such a recommendation query may be generated on a predetermined time interval, for example, weekly, monthly, or at some other time interval.

Following obtaining a recommendation query, or automatically at the expiration of a predetermined time interval, the recommendation generation application 118 proceeds to include those stored recommendations 136 that are valid and not affected by any events 142. Any of the stored recommendations 136 that are potentially invalidated (or potentially validated, in the opposite case) are then reevaluated by the recommendation generation application 118. The recommendation generation application 118 requests evaluation of the recommendation(s) from corresponding evaluation service providers 106 and obtains respective recommendation evaluations 148. The stored recommendations 136 that are still valid (or have become valid) may then be included in the list of recommendations.

Because of the potentially asynchronous nature of the processes sending events 127 to the recommendation generation application 118 and the batch updating of the stored recommendations 136, timestamps may need to be compared to ensure that the most recent evaluation of a recommendation is utilized. Further, the timestamps that are significant may be timestamps generated when the evaluations were completed, for example, instead of timestamps generated when the evaluations were initiated.

Additionally, in response to a recommendation query, the recommendation generation application 118 may be configured to evaluate one or more runtime recommendations 139. These runtime recommendations 139 correspond to recommendations that are preferably evaluated at runtime. As a non-limiting example, evaluation of a runtime recommendation 139 may be relatively fast and contribute insubstantial delay in the generation of the list of recommendations. As another non-limiting example, evaluation of a runtime recommendation 139 may be time dependent so as to obviate the advantages of the evaluation in advance. As yet another non-limiting example, evaluation of a runtime recommendation 139 may be merchant specific so as to make batch processing of the recommendation across all merchants an inefficient use of computing resources. If the recommendation evaluations 148 corresponding to the runtime recommendations 139 are valid, the valid runtime recommendations 139 may then be included in the list of recommendations by the recommendation generation application 118.

Before evaluating the recommendations in some embodiment, or after evaluating the recommendations in other embodiments, the recommendations may be filtered according to a recommendation filter list 145 associated with the merchant or generally applicable. The recommendation filter list 145 is used to exclude the enumerated recommendations from being evaluated and/or included in the list of recommendations generated by the recommendation generation application 118.

Figure 2:
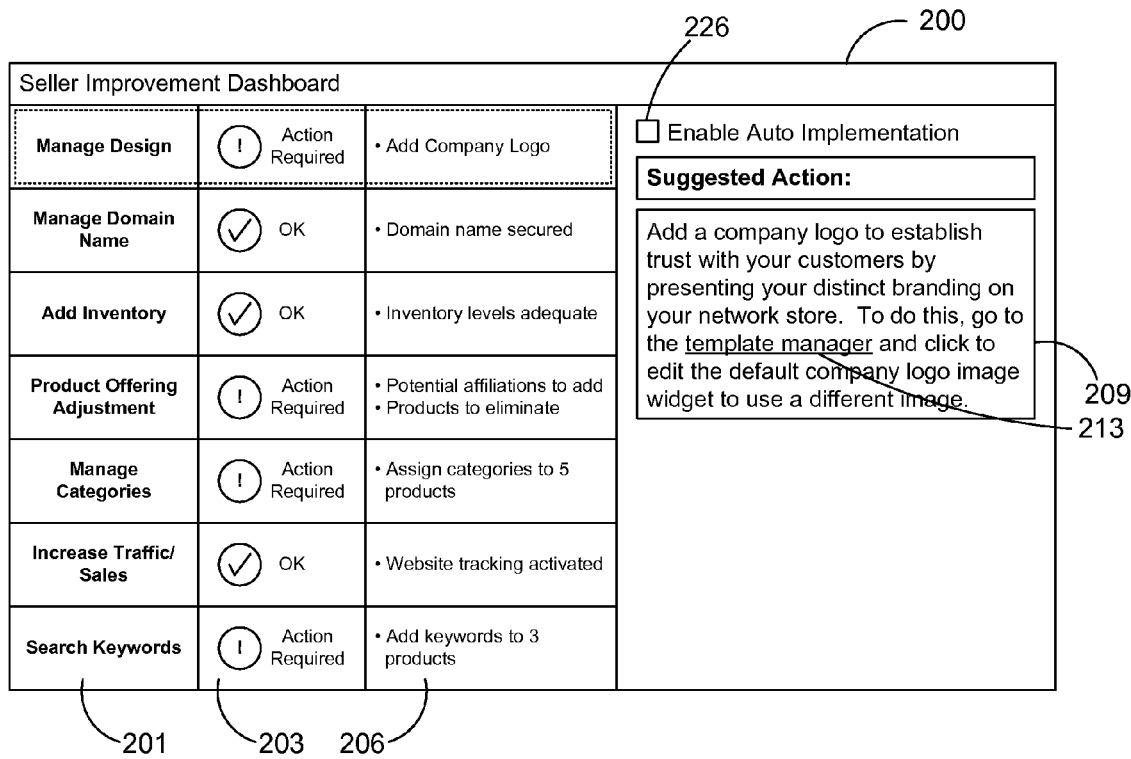
FIG. 2 is a drawing of an example of a user interface rendered by a client in the networked environment of FIG. 1 according to various embodiments of the present disclosure.

Thereafter, the list of recommendations generated by the recommendation generation application 118 may be returned to the network site administration application 124 or another application for delivery to the merchant user. In one embodiment, the list of recommendations may be included in a network page 130 requested by a client 109. FIG. 2 provides one example of such a list of recommendations as rendered in a client 109 in a rendered network page 157. In other embodiments, the list of recommendations may be delivery by another medium to the merchant, such as, for example, email, text message, instant message, telephone call, printed letter, etc.

Referring next to FIG. 2, shown is one example of a user interface 200 that facilitates communication of recommendations 201 to an online merchant hosted in the electronic marketplace. To this end, the network site data 133 (FIG. 1) associated with such online merchant is stored in the data store 115 (FIG. 1) and provides the evaluation service provider(s) 106 (FIG. 1) with information from which it may be determined whether the online merchant is operating in an optimal manner to maximize sales.

The user interface 200 lists a number of recommendations 201 such as managing the design of a network presence, managing a domain name associated with the network presence, adding or changing inventory sold through the network presence, and adjusting a product offering of the network presence. The recommendations 201 listed further relate to managing categories assigned to products in association with the network presence, increasing traffic and sales, managing search keywords associated with various products, and other recommendations 201.

The "manage design" recommendation 201 provides suggestions to improve the look and feel of a network presence such as a network site or other type of presence of an online merchant, such that users may be more inclined to purchase products from the online merchant. Such action may involve, for example, adding a company logo, changing colors of the presence, or other types of action. The "manage design" recommendation 201 is highlighted as being selected by a user. To this end, such recommendations 201 may be selected by positioning a cursor on a recommendation 201 and clicking thereon or by performing some other action as can be appreciated.

In one embodiment, associated with each of the recommendations 201 may be an implementation status 203. The implementation status 203 may indicate whether the recommendation is valid and whether an action has been taken to implement the recommendation 201. In other embodiments, a recommendation 201 that is invalid or otherwise nullified may be excluded from the listing in the user interface 200 by the recommendation generation application 118 (FIG. 1). Also associated with each of the recommendations 201 is an explanation 206 that indicates the type of actions that may be taken with respect to a network presence of an online merchant to implement the recommendation 201. Alternatively, the explanation may indicate other information relating to the recommendation 201.

Further, for a highlighted one of the recommendations 201, specific details describing the recommendation may be displayed in a "suggested action" box 209. The suggested action box 209 may include a link 213 or other component that may send the user through a predefined process to implement the highlighted recommendation 201. Such a process may be presented, for example, in the form of a wizard or other presentation as can be appreciated.

The user interface 200 also includes various buttons, links, or other graphical components that may be manipulated to generate further views of information relative to the recommendations 201. In addition, the user interface 200 includes an "enable auto implementation" toggle 226 that allows an online merchant to pre-authorize the automated implementation of recommendations that may be implemented without manual intervention as mentioned above.

Although the recommendations 201 depicted in the user interface 200 are delivered to a user by way of a browser 154 (FIG. 1) in the form of a dashboard generated by the network site administration application 124 (FIG. 1), it is possible that the same information may be presented to an online merchant in some other manner. For example, such information may be included in electronic mail (email) messages that are sent to an online merchant, SMS messages, physical mail delivered to customers, or in other manners as can be appreciated.

The various types of recommendations 201 that may be depicted in the user interface 200 may be based upon experience with online sales or based on other marketing or business considerations. The actions to be taken in view of such recommendations 201 are generally known to result in improved performance of the network presence of an online merchant. For example, the "manage design" recommendation 201 is presented so as to prompt an online merchant to add appropriate company logos or other design aspects to their network presence. The "manage domain name" recommendation 201 recommends creating a domain name for the online merchant and reflects the fact that customers may be more likely to purchase products from an online merchant that maintains their own domain name on the network. The "add inventory" recommendation 201 prompts a given online merchant to maintain adequate levels of inventory to service their customers. This prevents online merchants from running out of product, thereby diminishing sales and the effectiveness of their network presence.

The "product offering adjustment" recommendation 201 informs the online merchant of potential changes that they might want to make to their product line for more effective conversion resulting in greater profits. Such recommendations 201 may be to add certain items to their product line for various reasons. Alternatively, such a recommendation 201 may suggest the elimination of products that are poor performers for any one of a number of reasons. In addition, other types of adjustments to a product line of an online merchant may be recommended.

The "manage categories" recommendation 201 involves associating products with various categories such that an electronic commerce system can better present such products to customers. For example, various categories may exist such as clothing, electronics, books, and other categories that facilitate customer searches for products from among the full inventory available through the electronic commerce as can be appreciated. In some situations, if appropriate categories are not assigned to products in a product catalog of a respective online merchant, then such products might not actually show up in response to a customer specification of items viewed based on a given taxonomy that employs such categories, etc.

The "increase traffic/sales" recommendation 201 may involve the implementation of various tracking capabilities of the electronic commerce system or may be implemented to further determine how the network presence of the online merchant can be improved and traffic and sales through such network presence increased.

The "search keywords" recommendation 201 prompts an online merchant to associate keywords with products in the product catalog for such online merchant. To this end, the keywords may be employed as indices to identify products in response to customer word searches as can be appreciated.

Other types of recommendations 201 may include those that inform an online merchant of trends in sales that may cause an online merchant to make adjustments to their network presence or to the products offered. Such trends may be noticed by viewing all of the commercial activity by all online merchants in the electronic marketplace. Such trends may comprise, for example, types of products that are experiencing heightened sales in the marketplace, types of colors of items that are currently "hot" or preferred by customers, or other types of trends.

Also, a recommendation 201 may inform an online merchant of cyclical trends in business, such as the approach of holiday sale seasons or other types of cyclical concerns. To this end, such recommendations 201 might prompt online merchants to alter the design of their network presence to suit the cyclical trends such as, for example, including holiday declarations in the design, etc.

Also, a recommendation 201 may specifically inform an online merchant that a given item is out of stock, or that items related to the product offering of an online merchant that are sold by other online merchants are out of stock. In such case, a recommendation 201 may inform an online merchant that it might be advisable to obtain such products for sale through their network presence. In addition, the recommendations 201 may prompt many other types of actions that cause improvement in the operation of the network presence of an online merchant. In one embodiment, new recommendations 201 may be generated based upon a review of sales transaction data, client site interaction data, or other data associated with some or all of the online merchants whose network presence is hosted by the computing device 103.

Figure 3:
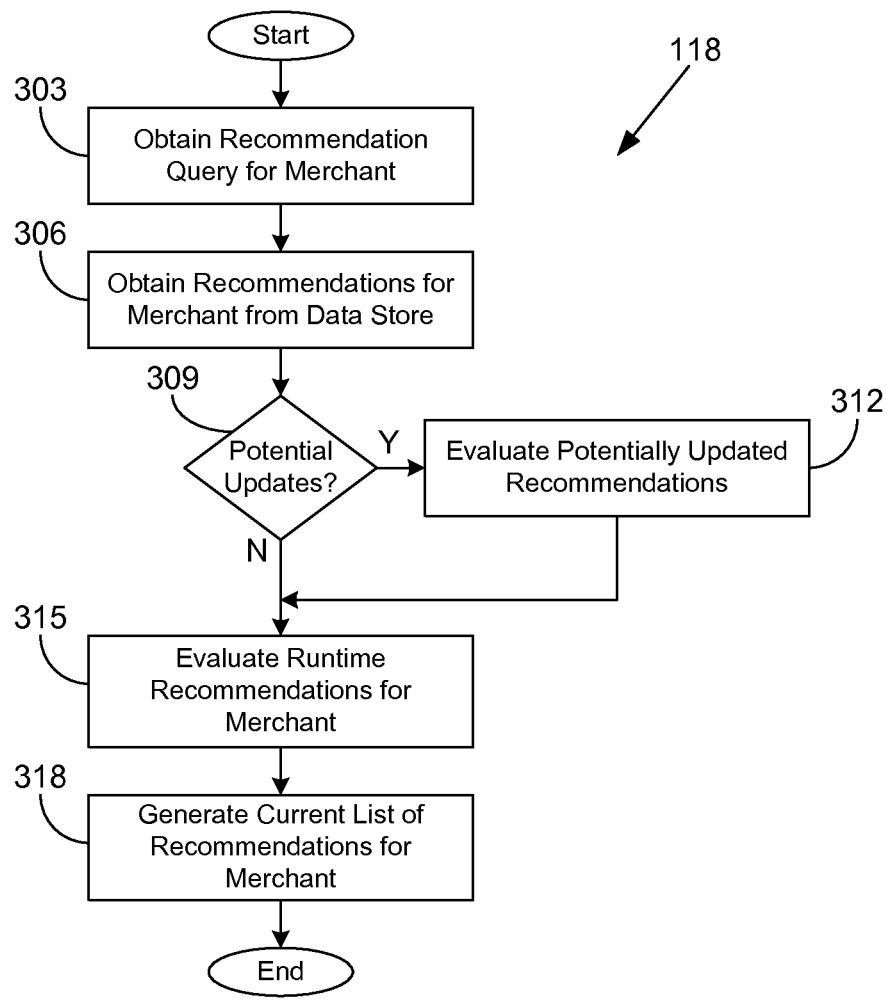
FIGS. 3-5 are flowcharts illustrating examples of functionality implemented as portions of a recommendation generation application executed in a computing device in the networked environment of FIG. 1 according to various embodiments of the present disclosure.

Referring next to FIG. 3, shown is a flowchart that provides one example of the operation of a portion of the recommendation generation application 118 according to various embodiments. It is understood that the flowchart of FIG. 3 provides merely an example of the many different types of functional arrangements that may be employed to implement the operation of the portion of the recommendation generation application 118 as described herein. As an alternative, the flowchart of FIG. 3 may be viewed as depicting an example of steps of a method implemented in the computing device 103 (FIG. 1) according to one or more embodiments.

Beginning with box 303, the recommendation generation application 118 obtains a recommendation query for a merchant in the electronic marketplace. Such a recommendation query may be automatically generated according to a predetermined time interval, or may be synchronously provided according to the request of a merchant for a network page 130 (FIG. 1) that contains a list of recommendations. In box 306, the recommendation generation application 118 obtains the stored recommendations 136 (FIG. 1) for the merchant from the data store 115 (FIG. 1). The stored recommendations 136 may have been evaluated for validity at a previous time, with an indication of validity stored along with the respective stored recommendations 136 for the merchant.

In box 309, the recommendation generation application 118 determines whether there are potential updates to the stored recommendations 136 for the merchant. In other words, the recommendation generation application 118 determines whether any stored recommendations 136 that were previously valid have been potentially invalidated. The recommendation generation application 118 may also be configured to determine whether any stored recommendations 136 that were previously invalid have potentially become valid. The determination of box 309 is made with reference to the events 142 (FIG. 1) that may indicate a change in evaluation status for one or more of the stored recommendations 136.

If the recommendation generation application 118 determines that stored recommendations 136 for the merchant have potentially been updated, the recommendation generation application 118 proceeds to box 312 and evaluates any potentially updated stored recommendations 136. To this end, the recommendation generation application 118 communicates with one or more evaluation service providers 106 (FIG. 1) to determine whether the stored recommendation 136 is valid. One or more recommendation evaluations 148 (FIG. 1) are returned to the recommendation generation application 118. The recommendation generation application 118 then proceeds to box 315.

If the recommendation generation application 118 determines in box 309 that the stored recommendations 136 have not been potentially updated, the recommendation generation application 118 also proceeds to box 315. In box 315, the recommendation generation application 118 evaluates one or more runtime recommendations 139 (FIG. 1) for the merchant. To this end, the recommendation generation application 118 communicates with one or more evaluation service providers 106 to determine whether the runtime recommendation 139 is valid. Such runtime recommendations 139 are not evaluated in advance for timeliness, to avoid unnecessary evaluation, and/or other reasons. In one embodiment, the evaluation of the runtime recommendations 139 may be performed in parallel with the actions performed in boxes 306-312.

In box 318, the recommendation generation application 118 generates a current list of recommendations for the merchant. In one embodiment, the list of recommendations comprises only those recommendations that are determined to be valid. In another embodiment, the list of recommendations comprises all of the recommendations for the merchant along with a currently updated indication of whether each of the recommendations is valid. Thereafter, the portion of the recommendation generation application 118 ends.

Figure 4:
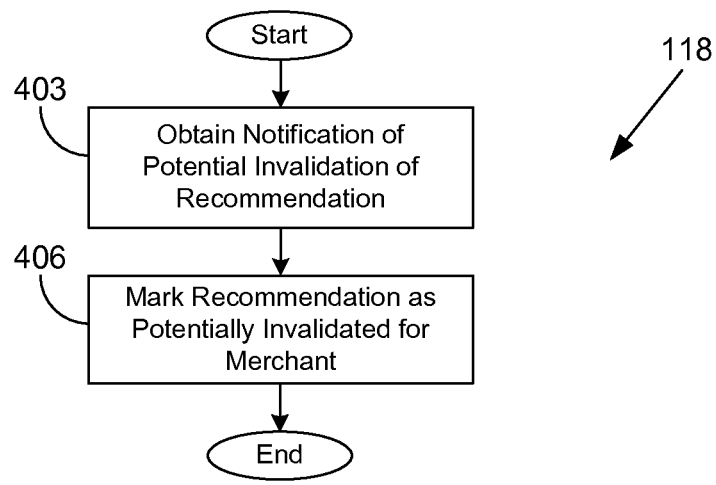

Turning now to FIG. 4, shown is a flowchart that provides an example of the operation of another portion of the recommendation generation application 118 according to various embodiments. It is understood that the flowchart of FIG. 4 provides merely an example of the many different types of functional arrangements that may be employed to implement the operation of the portion of the recommendation generation application 118 as described herein. As an alternative, the flowchart of FIG. 4 may be viewed as depicting an example of steps of a method implemented in the computing device 103 (FIG. 1) according to one or more embodiments.

Beginning with box 403, the recommendation generation application 118 obtains a notification of a potential invalidation of a stored recommendation 136 (FIG. 1). In another embodiment, the notification may concern a potential validation of a stored recommendation 136. The notification may comprise, for example, an event 127 (FIG. 1) sent by a network site modification tool 121 (FIG. 1), or may comprise a stored event 142 (FIG. 1) in the data store 115 (FIG. 1).

In box 406, the recommendation generation application 118 proceeds to mark the stored recommendation 136 as potentially invalidated for the merchant. In another embodiment, the recommendation generation application 118 may mark the stored recommendation 136 as potentially validated, where the stored recommendation 136 is currently invalid. Thereafter, the portion of the recommendation generation application 118 ends.

Figure 5:
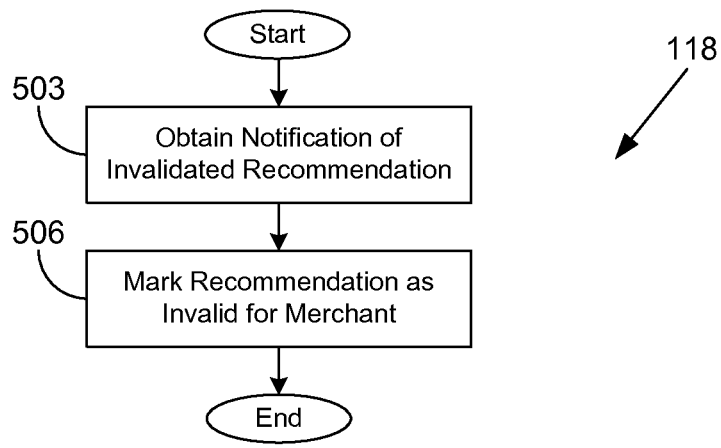

Moving on to FIG. 5, shown is a flowchart that provides an example of the operation of yet another portion of the recommendation generation application 118 according to various embodiments. It is understood that the flowchart of FIG. 5 provides merely an example of the many different types of functional arrangements that may be employed to implement the operation of the portion of the recommendation generation application 118 as described herein. As an alternative, the flowchart of FIG. 5 may be viewed as depicting an example of steps of a method implemented in the computing device 103 (FIG. 1) according to one or more embodiments.

Beginning with box 503, the recommendation generation application 118 obtains a notification of an invalidated recommendation. Such a notification may comprise an event 127 (FIG. 1) generated by a network site modification tool 121 (FIG. 1) or may comprise a stored event 142 (FIG. 1) in the data store 115 (FIG. 1). In another embodiment, the notification may be of a validated recommendation, where the recommendation was previously valid.

In box 506, the recommendation generation application 118 marks the recommendation as invalid for the merchant. Where the notification in box 503 is of a validated recommendation, the recommendation generation application 118 may be configured to mark the recommendation as valid. Although the recommendation may correspond to a stored recommendation 136 (FIG. 1), the recommendation may also correspond to a runtime recommendation 139 (FIG. 1). To this end, the recommendation generation application 118 may be configured to modify the recommendation filter list 145 (FIG. 1) for the merchant so that the recommendation is excluded for consideration when it is invalid or included for consideration when it is valid. Thereafter, the portion of the recommendation generation application 118 ends.

Figure 6:
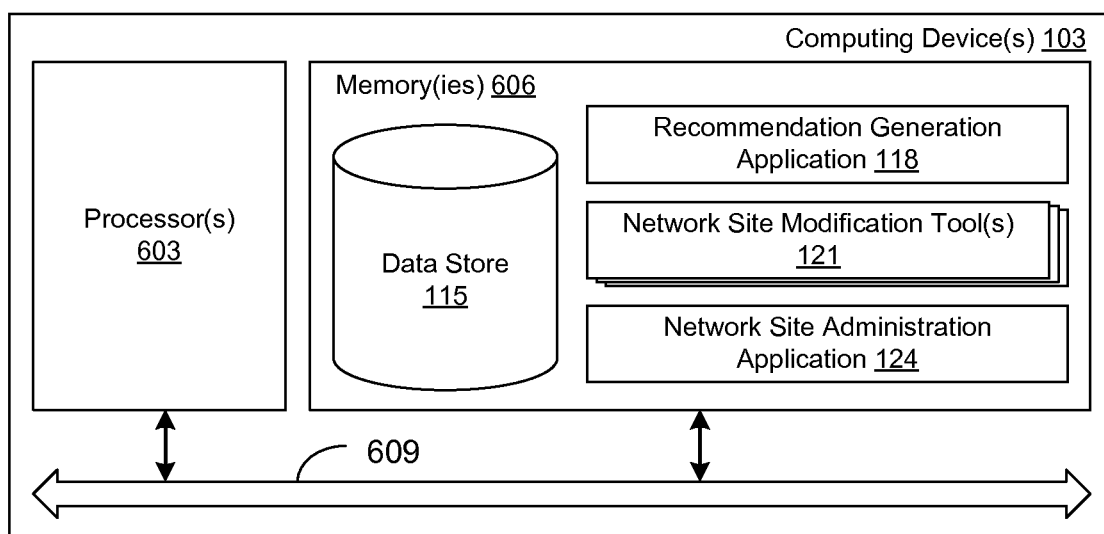
FIG. 6 is a schematic block diagram that provides one example illustration of a computing device employed in the networked environment of FIG. 1 according to various embodiments of the present disclosure.

With reference to FIG. 6, shown is a schematic block diagram of the computing device 103 according to an embodiment of the present disclosure. The computing device 103 includes at least one processor circuit, for example, having a processor 603 and a memory 606, both of which are coupled to a local interface 609. To this end, the computing device 103 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the recommendation generation application 118, one or more network site modification tools 121, the network site administration application 124, and potentially other applications. Also stored in the memory 606 may be a data store 115 and other data. In addition, an operating system may be stored in the memory 606 and executable by the processor 603.

It is understood that there may be other applications that are stored in the memory 606 and are executable by the processors 603 as can be appreciated. Where any component discussed herein is implemented in the form of software, any one of a number of programming languages may be employed such as, for example, C, C++, C#, Objective C, Java, Java Script, Perl, PHP, Visual Basic, Python, Ruby, Delphi, Flash, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and the memory 606 may represent multiple memories 606 that operate in parallel processing circuits, respectively. In such a case, the local interface 609 may be an appropriate network 112 (FIG. 1) that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the recommendation generation application 118, the network site modification tools 121, the network site administration application 124, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3-5 show the functionality and operation of an implementation of portions of the recommendation generation application 118. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIGS. 3-5 show a specific order of execution, it is understood that the order of execution may differ from that which is depicted. For example, the order of execution of two or more blocks may be scrambled relative to the order shown. Also, two or more blocks shown in succession in FIGS. 3-5 may be executed concurrently or with partial concurrence. Further, in some embodiments, one or more of the blocks shown in FIGS. 3-5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the recommendation generation application 118, the network site modification tools 121, and the network site administration application 124, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method comprising:
    storing, by a computing device at a data store, a plurality of advance recommendations for modifying a network page of one of a plurality of merchants in an electronic marketplace as a result of an examination of the network page, individual ones of the plurality of advance recommendations presenting an action to be performed to improve an online presence of the one of the plurality of merchants in the electronic marketplace;
    retrieving, by the computing device from the data store, an indication that one or more corresponding actions have been completed to improve the online presence of the one of the plurality of merchants in the electronic marketplace;
    determining, by the computing device, that one of the plurality of merchants has invalidated at least one of the plurality of advance recommendations from the retrieved indication;

reevaluating, by the computing device, the at least one of the plurality of advance recommendations for the one of the plurality of merchants in response to a recommendation query to generate a list of valid recommendations for the one of the plurality of merchants, wherein the recommendation query is received from a client computing device, wherein the plurality of advance recommendations are evaluated in advance of the computing device processing the recommendation query;

evaluating, by the computing device, validity of a plurality of runtime recommendations for modifying the network page of the one of the plurality of merchants in the electronic marketplace, wherein the plurality of runtime recommendations are evaluated concurrently with processing of the recommendation query, wherein each period of evaluation for the plurality of runtime recommendations is less than a designated period of time, wherein each period of evaluation for the plurality of advance recommendations is greater than the designated period of time;

generating, by the computing device, the list of the valid recommendations that correspond to actions that have not yet been completed for the one of the plurality of merchants by excluding the one of the plurality of recommendations to which the one or more corresponding actions have been completed from the list of valid recommendations, wherein the list of valid recommendations comprise at least one valid advance recommendation and at least one runtime recommendation; and transmitting, by the computing device over a communication network, the list of valid recommendations to the client computing device, wherein the list of valid recommendations is displayed by the client computing device and comprises at least one network link configured to enable implementation of one of the valid recommendations included in the list.

2. A method, comprising:

storing, in at least one computing device, a plurality of advance recommendations for modifying a network page of one of a plurality of merchants in an electronic marketplace as a result of an examination of the network page, wherein a recommendation indicates a corresponding action to be completed;

storing, in the at least one computing device, an indication that the corresponding action for one of the plurality of advance recommendations has been completed by the one of the plurality of merchants;

evaluating, in the at least one computing device, the one of the plurality of advance recommendations for the one of the plurality of merchants in the electronic marketplace and the indication to determine whether the corresponding action for the one of the plurality of advance recommendations has been completed in response to a recommendation query to generate a list of valid recommendations for the one of the plurality of merchants, wherein the recommendation query is received from a client computing device, wherein the plurality of advance recommendations are evaluated in advance of the at least one computing device processing the recommendation query;

evaluating, in the at least one computing device, validity of a plurality of runtime recommendations for modifying the network page of the one of the plurality of merchants in the electronic marketplace, wherein the plurality of runtime recommendations are evaluated concurrently with processing of the recommendation query to generate the list of valid recommendations for the one of the plurality of merchants, wherein each period of evaluation for the plurality of runtime recommendations is less than a designated period of time, wherein each period of evaluation for the plurality of advance recommendations is greater than the designated period of time;

generating, in the at least one computing device, the list of the valid recommendations that correspond to actions that have not yet been completed for the one of the plurality of merchants by excluding the one of the plurality of advance recommendations to which the corresponding action has been completed from the list of valid recommendations, wherein the list of valid recommendations comprise at least one valid advance recommendation and at least one runtime recommendation; and transmitting, by the at least one computing device over a communication network, the list of valid recommendations to the client computing device, wherein the list of valid recommendations is displayed by the client computing device and comprises at least one network link configured to enable implementation of one of the valid recommendations included in the list.

3. The method of claim 2, further comprising:

obtaining, in the at least one computing device, a notification that the corresponding action has been completed by the one of the plurality of merchants; and reevaluating, in the at least one computing device, the one of the plurality of advance recommendations for the one of the plurality of merchants to determine whether one of the actions has been completed in response to another recommendation query for the one of the plurality of merchants.

4. The method of claim 3, wherein the notification corresponds to a commencement of a network site modification session by the one of the plurality of merchants.

5. The method of claim 2, further comprising:

obtaining, in the at least one computing device, a request for a network page from the one of the plurality of merchants at the client computing device;

submitting, in the at least one computing device, the recommendation query for the one of the plurality of merchants in response to obtaining the request;

generating, in the at least one computing device, the network page including the list of valid recommendations that correspond to the actions that have not yet been completed for the one of the plurality of merchants; and sending the network page to the client computing device.

6. The method of claim 2, wherein the list of the valid recommendations excludes recommendations contained in a list of excluded recommendations for the one of the plurality of merchants.

7. The method of claim 2, wherein the evaluating the one of the plurality of advance recommendations step is performed at a predetermined interval according to a batch process.

8. The method of claim 2, further comprising:

obtaining, in the at least one computing device, a notification that another action has been completed by the one of the plurality of merchants; and excluding, in the at least one computing device, another one of the plurality of advance recommendations that corresponds to the other action from the list of valid recommendations in response to the notification.

9. A system, comprising:

at least one computing device; and a recommendation generation application executable in the at least one computing device, the recommendation generation application configured to at least:

store a plurality of advance recommendations for modifying a network page of one of a plurality of merchants in an electronic marketplace as a result of an examination of the network page, wherein a recommendation indicates a corresponding action to be completed;

store a first indication that the corresponding action for one of the plurality of advance recommendations has been completed by the one of the plurality of merchants;

evaluate for validity the one of the plurality of advance recommendations for the one of the plurality of merchants in the electronic marketplace by reviewing the first indication in response to a recommendation query to generate a list of valid recommendations for the one of the plurality of merchants, wherein the recommendation query is received from a client computing device;

evaluate validity of a plurality of runtime recommendations for modifying the network page of the one of the plurality of merchants in the electronic marketplace, wherein the plurality of runtime recommendations are evaluated concurrently with processing of the recommendation query, wherein each period of evaluation for the plurality of runtime recommendations is less than a designated period of time, wherein each period of evaluation for the plurality of advance recommendations is greater than the designated period of time;

generate the list of valid recommendations for the one of the plurality of merchants by excluding the one of the plurality of advance recommendations to which the corresponding action has been completed from the list of valid recommendations, wherein the list of valid recommendations comprise at least one valid advance recommendation and at least one runtime recommendation; and transmit over a communication network, the list of valid recommendations to the client computing device, wherein the list of valid recommendations is displayed by the client computing device and comprises at least one network link configured to enable implementation of one of the valid recommendations included in the list.

10. The system of claim 9, wherein the recommendation generation application is further configured to store a second indication of which ones of the plurality of advance recommendations are valid in a data store.

11. The system of claim 9, wherein the recommendation generation application is further configured to determine that the one of the plurality of merchants has invalidated the one of the plurality of advance recommendations.

12. The system of claim 9, wherein individual ones of the plurality of advance recommendations comprise a recommendation for the one of the plurality of merchants to perform at least one action to improve an online presence of the one of the plurality of merchants in the electronic marketplace, wherein the at least one action corresponds to a specific network site modification tool.

13. The system of claim 12, wherein evaluating an advance recommendation for validity comprises determining whether the corresponding at least one action has been performed using the specific network site modification tool, the advance recommendation being valid when the corresponding at least one action has yet to be performed by the specific network site modification tool.

14. The system of claim 9, wherein the recommendation generation application is further configured to determine that the one of the plurality of merchants has actually invalidated the one of the plurality of advance recommendations.

15. The system of claim 9, further comprising a network site administration application executable in the at least one computing device, wherein the network site administration application is configured to at least:

obtain a request for the network page from the one of the plurality of merchants at the client computing device;

submit the recommendation query for the one of the plurality of merchants to the recommendation generation application in response to the request;

generate the network page including the list of valid recommendations; and send the network page to the client computing device.

16. The system of claim 9, wherein the recommendation generation application is further configured to send the list of valid recommendations to the one of the plurality of merchants by email.

17. The system of claim 9, wherein the recommendation generation application is further configured to determine which of a plurality of evaluations for the one of the plurality of advance recommendations is most recent according to a corresponding timestamp associated with individual ones of the plurality of evaluations.

18. The system of claim 9, wherein the recommendation generation application is further configured to evaluate for validity a different plurality of advance recommendations for the one of the plurality of merchants in response to the recommendation query for the one of the plurality of merchants.

19. The system of claim 9, wherein the recommendation generation application is further configured to filter the list of valid recommendations for the one of the plurality of merchants according to a list of invalid recommendations associated with the one of the plurality of merchants.

20. The system of claim 9, further comprising:

a network site modification tool executable in the at least one computing device, the network site modification tool configured to at least:

send an update event to the recommendation generation application when the one of the plurality of merchants commences a network site modification session using the network site modification tool; and wherein the recommendation generation application is further configured to designate the one of the plurality of advance recommendations as invalidated in response to obtaining the update event from the network site modification tool.

* * * * *